(12) United States Patent
Bray et al.

(10) Patent No.: US 7,317,268 B2
(45) Date of Patent: Jan. 8, 2008

(54) SYSTEM AND METHOD FOR COOLING A SUPER-CONDUCTING DEVICE

(75) Inventors: James William Bray, Niskayuna, NY (US); Albert Eugene Steinbach, Schenectady, NY (US); Richard Nils Dawson, Voorheesville, NY (US); Evangelos Trifon Laskaris, Schenectady, NY (US); Xianrul Huang, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 166 days.

(21) Appl. No.: 10/813,366

(22) Filed: Mar. 30, 2004

(65) Prior Publication Data

US 2005/0218752 A1 Oct. 6, 2005

(51) Int. Cl.
*H02K 9/00* (2006.01)
(52) U.S. Cl. ............................ 310/61; 310/52; 310/54
(58) Field of Classification Search ............ 310/52–59, 310/60 A, 61–63
See application file for complete search history.

(56) References Cited

U.S. PATENT DOCUMENTS

| | | | |
|---|---|---|---|
| 4,035,678 A * | 7/1977 | Lambrecht et al. ............ 310/52 |
| 4,123,677 A | 10/1978 | Laskaris et al. ............... 310/52 |
| 4,164,126 A | 8/1979 | Laskaris et al. ................ 62/55 |
| 4,194,137 A * | 3/1980 | Vinokurov et al. ............ 310/52 |
| 4,204,134 A | 5/1980 | Fritz et al. |
| 4,227,102 A * | 10/1980 | Rozenfeld et al. ............ 310/52 |
| 4,236,091 A * | 11/1980 | Kutateladze et al. .......... 310/64 |
| 4,297,603 A | 10/1981 | Weghaupt et al. |
| 4,309,632 A * | 1/1982 | Muller et al. .................. 310/52 |
| 4,356,700 A | 11/1982 | Eckels et al. ................... 62/55 |
| 4,377,253 A | 3/1983 | Bruneel et al. |
| 4,515,397 A | 5/1985 | Nowebilski et al. |
| 6,313,556 B1 * | 11/2001 | Dombrovski et al. ......... 310/91 |
| 6,351,045 B1 * | 2/2002 | Shoykhet ...................... 310/52 |
| 6,412,289 B1 | 7/2002 | Laskaris et al. ............. 62/50.7 |
| 6,536,218 B1 * | 3/2003 | Steinmeyer ...................... 62/6 |
| 2002/0170298 A1 | 11/2002 | Laskaris et al. ............... 62/64 |

FOREIGN PATENT DOCUMENTS

| | | |
|---|---|---|
| DE | 2742477 | 3/1979 |
| DE | 3104469 | 8/1982 |
| DE | 4133262 | 4/1993 |
| EP | 0570786 | 11/1993 |

* cited by examiner

*Primary Examiner*—Thanh Lam
(74) *Attorney, Agent, or Firm*—Fletcher Yoder (57) ABSTRACT

A system and method for cooling a superconductive rotor coil. The system comprises a rotatable shaft coupled to the superconductive rotor coil. The rotatable shaft may comprise an axial passageway extending through the rotatable shaft and a first passageway extending through a wall of the rotatable shaft to the axial passageway. The axial passageway and the first passageway are operable to convey a cryogenic fluid to the superconductive rotor coil through the wall of the rotatable shaft. A cryogenic transfer coupling may be provided to supply cryogenic fluid to the first passageway.

28 Claims, 5 Drawing Sheets

SYSTEM AND METHOD FOR COOLING A SUPER-CONDUCTING DEVICE

STATEMENT REGARDING FEDERALLY SPONSORED RESEARCH & DEVELOPMENT

This invention was made with Government support under contract number DE-FC36-02GO11100 awarded by the U.S. Department of Energy. The Government has certain rights in the invention.

BACKGROUND

The present invention relates generally to a rotating electrical machine employing a superconductive coil. More particularly, the present invention relates to a system and method for transferring a cryogenic fluid from a stationary source of cryogenic fluid to a rotating superconductive coil.

Rotating electrical machines, such as motors and generators, have a rotor and a stator that are magnetically coupled. Typically, the rotor has a coil that is used to produce a magnetic field. Electricity flowing through the rotor coil produces the magnetic field. In a generator, the rotor is coupled to a prime mover that rotates the rotor, producing a rotating magnetic field that induces a voltage in the stator. The voltage produced in the stator may be used to supply power to an electrical grid. In a motor, the stator produces a rotating magnetic field that interacts with the magnetic field produced by the rotor coil to induce rotation of the rotor.

Conventional copper conductors are commonly used to form the rotor coils. However, the electrical resistance of copper is sufficient to produce a substantial amount of resistive heat losses in the rotor coil, which reduces the efficiency of the rotating machine. In response to the losses caused by conventional copper conductors, superconductors have been developed for use as rotor coils. A superconductor is a material that loses its electrical resistance below a characteristic transition temperature, making it desirable for use as a rotor coil.

In rotating machines employing superconductive rotor coil, the rotor coil is cooled by a cryogenic fluid to lower the temperature of the superconductive coil below the transition temperature. Below the transition temperature, the superconductive rotor coil enters a superconducting state and loses its electrical resistance. Typically, a cryogenic fluid is provided to the superconductive coil by an external source of cryogenic fluid. The cryogenic fluid absorbs heat from the superconductive rotor coil, which maintains the rotor coil below the transition temperature and in a superconducting state. The cryogenic fluid for cooling the superconductive rotor coil is transferred between the source of cryogenic fluid and the rotor by a transfer coupling located at one end of the rotor shaft.

However, a number of problems are associated with transferring cryogenic fluid through the end of the rotor shaft. For example, a generator may be disposed between two turbines. In this arrangement, neither end of the rotor shaft is accessible to supply cryogenic fluid to the rotor coil.

There is a need, therefore, for an improved technique for transferring cryogenic fluid to a rotor of a superconductive rotating machine. There is a particular need for a technique, which can be employed to transfer cryogenic fluid to the rotor of a generator disposed between two prime movers, such as a gas turbine or a steam turbine.

BRIEF DESCRIPTION

In accordance with one aspect of the present technique, a rotating machine system comprising a superconductive rotor coil and a rotatable shaft is provided. The rotatable shaft has an axial passageway that extends through the rotatable shaft. The rotatable shaft also comprises a passageway that extends through the rotatable shaft from an outer surface of the rotatable shaft to the axial passageway. The axial passageway and the first passageway are operable to convey a cryogenic fluid to the superconductive rotor coil.

In accordance with another aspect of the present technique, a system for cryogenically cooling a superconductive rotor coil is provided: The system comprises a transfer coupling operable to be disposed radially around a rotatable shaft. The transfer coupling is operable to couple cryogenic fluid between a source of cryogenic fluid and a passageway extending through the rotatable shaft. The cryogenic fluid may be coupled from the rotatable shaft to the superconductive rotor coil.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
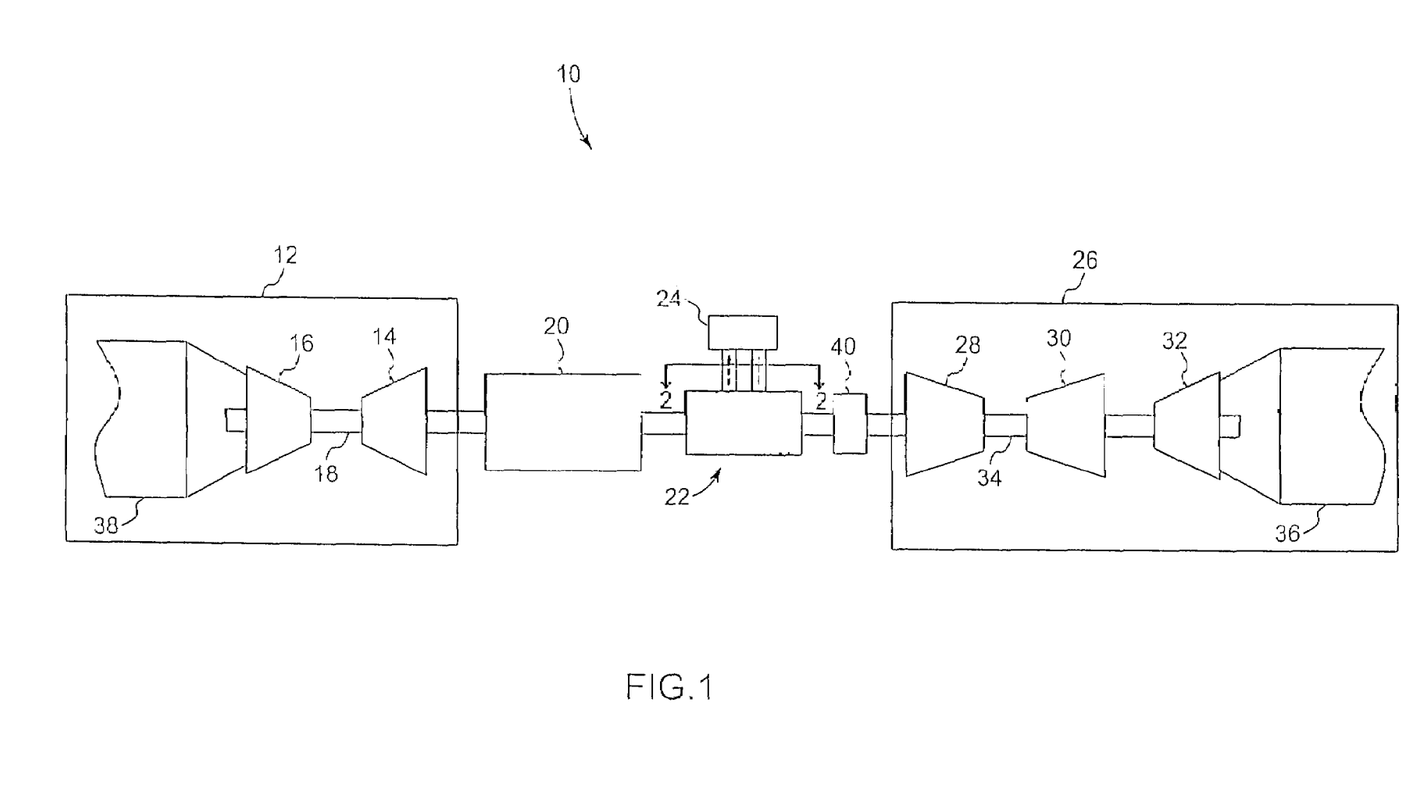
FIG. 1 is a schematic diagram of a power generation system, in accordance with an exemplary embodiment of the present technique.

Turning now to the drawings, FIG. 1 illustrates a power generation system, represented generally by reference numeral 10. In the illustrated embodiment, the power generation system 10 comprises a gas turbine system 12 that uses the combustion of a gas to generate power. The illustrated gas turbine system 12 comprises a compressor 14 that is coupled to a gas turbine 16 via a rotatable shaft 18. The gas turbine 16 converts the energy produced by the combustion into rotation of the shaft 18. The compressor 14 raises the pressure of the air flowing into the gas turbine 16 for combustion, improving the efficiency of the combustion process.

The shaft 18 of the gas turbine system 12 is coupled to a generator 20, which converts the rotational energy in the shaft 18 into electricity. As will be discussed in more detail below, the generator 20 has a superconductive rotor coil that receives cryogenic fluid to cool the superconductive rotor coil to a superconducting state. The cryogenic fluid is supplied to the superconductive rotor coil through the shaft 18. A cryogenic transfer coupling 22 is provided to transfer cryogenic fluid between the shaft 18 and a source of cryogenic fluid 24.

The illustrated power generation system 10 also comprises a steam turbine 26. In this embodiment, the steam turbine 26 comprises a high-pressure module 28, an intermediate-pressure module 30, and a low-pressure module 32. The high-pressure module 28, the intermediate-pressure module 30, and the low-pressure module 32 are coupled to a shaft 34. Steam flowing through the high-pressure module 28, the intermediate-pressure module 30, and the low-pressure module 32 induces rotation of the shaft 34. The steam looses pressure as it flows through the steam turbine 26. The high-pressure module 28, the intermediate-pressure module 30, and the low-pressure module 32 are adapted to operate at different steam pressures to improve the efficiency of the steam turbine 26. After passing through the low-pressure module, the steam is condensed into a liquid by a condenser 36.

The steam turbine 26 is provided to improve the efficiency of the power generation system 10 by using steam produced by the combustion products generated by the gas turbine system 12. The gas turbine system 12 has a plurality of heat recovery steam generator tubes 38 that extract heat from the combustion products produced by the gas turbine 16. The liquid condensate from the condenser 36 of the steam turbine 26 is pumped to the heat recovery steam generator tubes 38. The heat of the combustion products is transferred to the liquid, producing steam. The steam is then supplied to the steam turbine 26 to drive the shaft 34. The shaft 34 of the steam turbine 26 is coupled to the shaft 18 of the gas turbine 12 by a flexible coupling 40. The flexible coupling 40 couples the two shafts 18 and 34, while enabling the shafts 18 and 34 to have a degree of relative movement.

Figure 2:
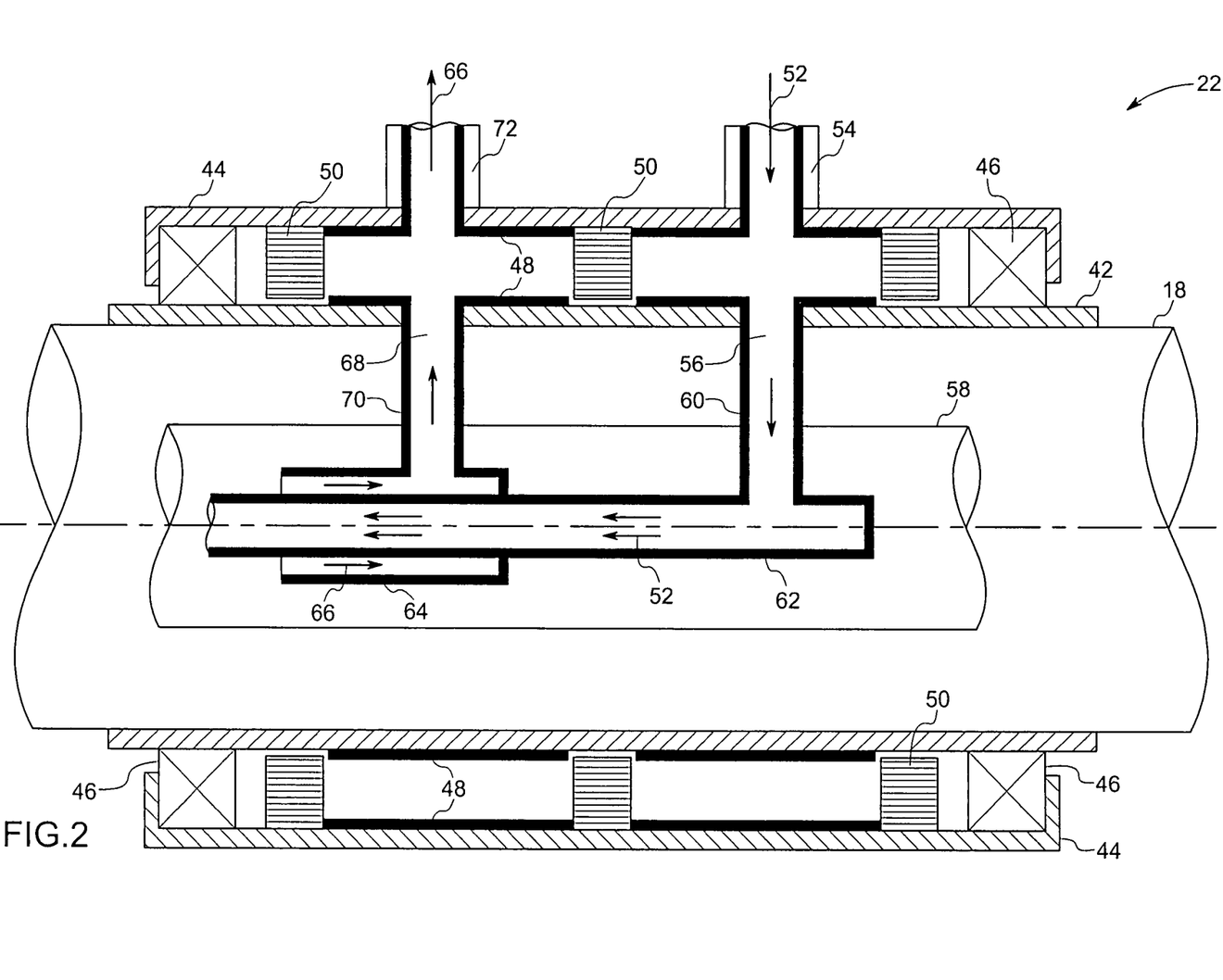
FIG. 2 is a cross-sectional view of a cryogenic fluid transfer coupling, taken generally along line 2-2 of FIG. 1.

Referring generally to FIG. 2, a cross-sectional view of the cryogenic transfer coupling 22 is provided. The cryogenic transfer coupling 22 is disposed around the shaft 18 and enables cryogenic fluid to be transferred between the shaft 18 and the source of cryogenic fluid 24 illustrated in FIG. 1. The cryogenic transfer coupling 24 enables cryogenic fluid to be transferred to the shaft 18 at any point along the shaft 18, not just at either end of the shaft 18. The cryogenic fluid is usually an inert fluid, such as helium, neon, hydrogen or nitrogen. The temperature of the cryogenic fluid is generally below 30° K and preferably around 27° K.

The cryogenic transfer coupling 22 comprises a rotating collar 42 secured to the shaft 18 and a stationary collar 44 disposed around the rotating collar 42. Bearings 46 are provided to support the cryogenic transfer coupling 22 on the shaft 18. The stationary collar 44 has insulated annular walls 48. In general, all walls between the cryogenic fluid and ambient must be insulated. Insulation usually consists of double walls with vacuum and emissivity reduction in between. Seals 50 are provided to form a seal between the rotating components and the stationary components of the transfer coupling 22. The seals 50 may be contact or non-contact clearance seals, such as a ferro-fluidic seal, a brush seal, or a labyrinth seal. However, other types of seals 50 may be used. Cryogenic fluid 52 flows into the transfer coupling 22 through an inlet line 54.

The rotatable shaft 18 has an inlet passageway 56 that leads to a central passageway 58 extending axially though the shaft 18. In the illustrated embodiment, the inlet passageway 56 extends radially through the wall of the shaft 18 from the central passageway 58 to the transfer coupling 22. However, the inlet passageway 56 may be curved or have some other shape. All passageways with contact between ambient and cryogens (e.g., 56,58) must have insulated walls (e.g., 60,70,62,64), as stated above, to reduce the transfer of heat from the shaft 18 to the cryogenic fluid 52.

A first tube 62 and a second tube 64 are disposed in the central passageway 58 to enable cryogenic fluid 52, 66 to flow in two directions through the central passageway 58. The first tube 62 is disposed within the second tube 64 in a telescopic arrangement. The first tube 62 has an opening that is aligned with the inlet passageway 56 to enable cryogenic fluid 52 to flow into the first tube 62 from the inlet passageway 56. The first tube 62 directs cryogenic fluid 52 to the generator 20 illustrated in FIG. 1. Heated cryogenic fluid 66 flows from the generator 20 in the annulus formed between the first tube 62 and the second tube 64.

The shaft 18 has an outlet passageway 68 that extends radially outward through a wall of the shaft 18 from the central passageway 58 to the transfer coupling 22. The outlet passageway 68 enables cryogenic fluid 66 to flow radially out of the shaft 18 to the cryogenic transfer coupling 22. The outlet passageway 68 also has an insulated tube 70 that is disposed within the outlet passageway 68 to prevent heat transfer from the shaft 18 to the cryogenic fluid 66. The second tube 64 has an opening that is aligned with the outlet passageway 68 to enable cryogenic fluid 66 to flow from the second tube 64 to the outlet passageway 68. The transfer coupling 22 has an outlet line 72 that directs the cryogenic fluid 66 from the transfer coupling 22 to the source of cryogenic fluid 24 illustrated in FIG. 1.

In the illustrated embodiment, all tubes which are between cryogenic temperatures and ambient (e.g., 72, 54, the inlet tube 60, the first axial tube 62, the second axial tube 64, and the outlet tube 70) are doubled walled and vacuum-sealed. Additional insulation may be provided on the outer surfaces of such tubes. A reflective metal, such as silver or MLI, may be coated on the inner vacuum walls of said tubes to reduce the emissivity of said tubes, thereby reducing radiative heat transfer from the tubes to the cryogenic fluid. We note that some boundaries, such as the one between tube 62 and 64, have small temperature gradients across them because cryogenic fluids are on both sides of the walls, and so lesser insulation may be employed in such cases.

Figure 3:
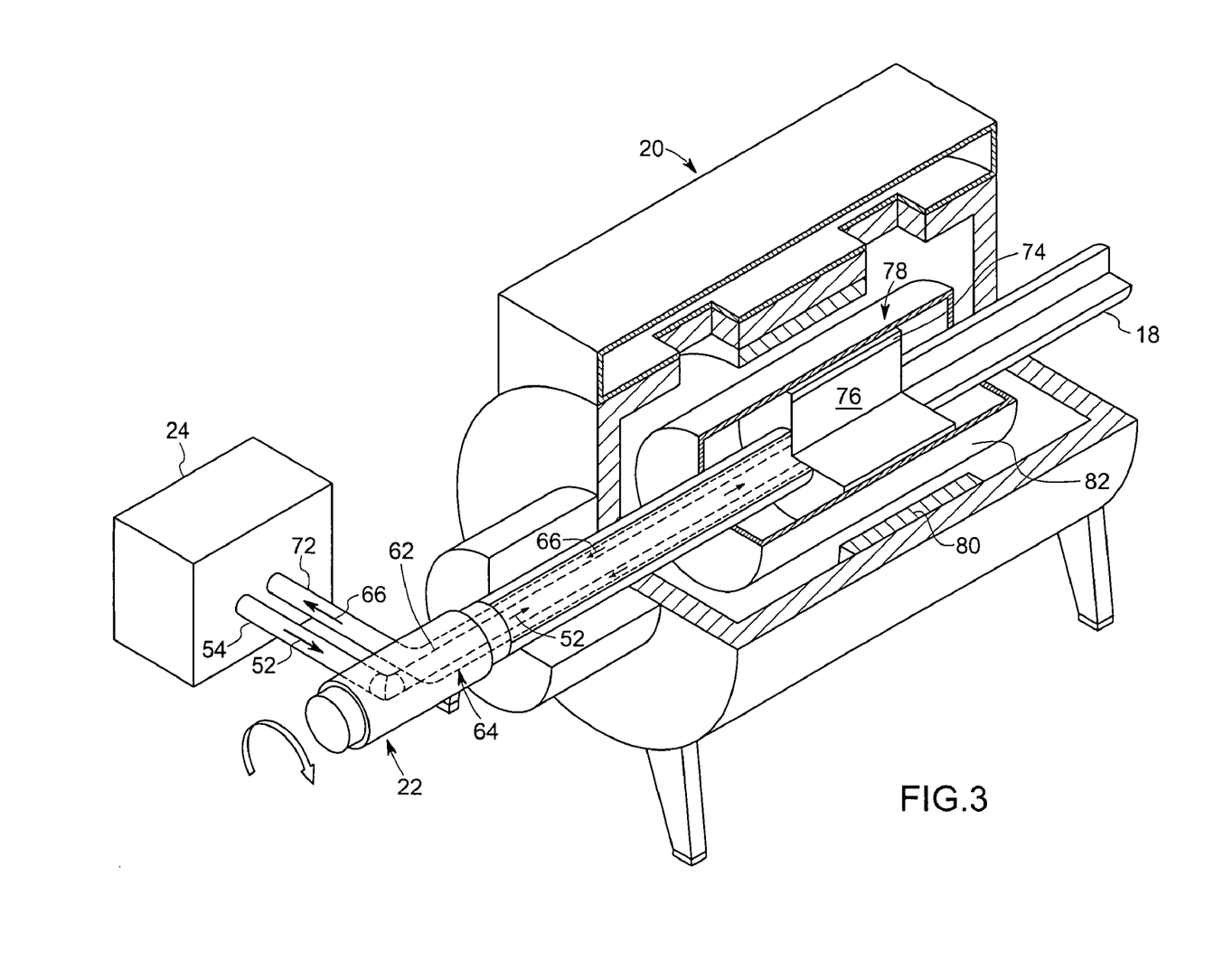
FIG. 3 is a perspective view of the generator and the cryogenic fluid transfer coupling, in accordance with an exemplary embodiment of the present technique.

Referring generally to FIG. 3, the cryogenic fluid 52 is used to cool a superconductive rotor coil 74 disposed within the generator 20. The superconductive rotor coil 74 is wound on a core 76 of a rotor 78. The generator 20 also comprises a stator 80 disposed circumferentially around the rotor 78. As the rotor 78 rotates within the stator 80, electrical current within the superconductive rotor coil 74 generates a magnetic field that induces a voltage within the stator 80.

The cryogenic fluid 52 cools the superconductive rotor coil 74 to maintain the coil 74 in a superconducting state. The source of cryogenic fluid 24 provides the force to induce the flow of cryogenic fluid 52 through the generator 20. In addition, the source of cryogenic fluid 24 removes the heat transferred to the cryogenic fluid 66 from the superconductive coil 74 and thermal leaks. As discussed above, the transfer coupling 22 supplies cryogenic fluid 52 through a side of the shaft 18, rather than axially through an end of the shaft 18. Similarly, the transfer coupling 22 receives cryogenic fluid 66 radially from the shaft 18, rather than from an end of the shaft 18.

The cryogenic fluid 52 flows through the first axial tube 62 within the shaft 18 to the rotor 78. The rotor 78 has a vacuum jacket 82 to insulate the rotor 78. The rotor 78 couples the cryogenic fluid 52 to the superconductive coil 74. The cryogenic fluid 52 removes heat from the superconductive coil 74 and maintains the coil 74 below the operating temperature to maintain the coil 74 in a superconducting state, i.e., with no electrical resistance. The rotor 78 then couples the warmed cryogenic fluid 66 to the annulus between the first axial tube 62 and the second axial tube 64. The warmed cryogenic fluid 66 is coupled through the transfer coupling 22 to the source of cryogenic fluid 24.

Heat transfer losses to the cryogenic fluid are minimized to conserve refrigeration power and to maintain the low operating temperatures needed for the superconductive coil 74 to remain superconducting. Heat losses are minimized by minimizing cooling fluid leakage and by minimizing heat transfer to the cryogenic cooling fluid.

Figure 4:
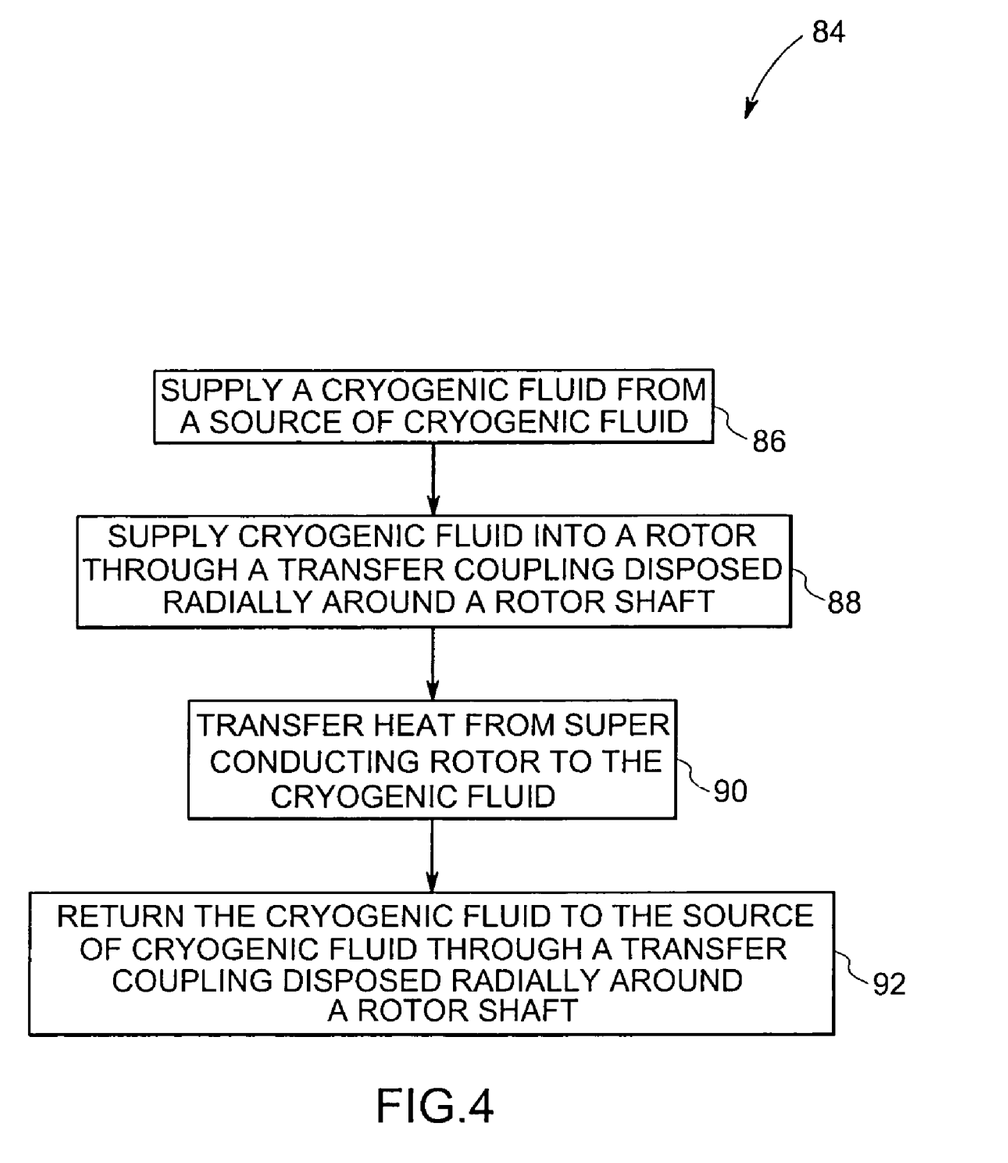
FIG. 4 is a block diagram illustrating a method of cooling a superconductive device, in accordance with an exemplary embodiment of the present technique.

Referring generally to FIG. 4, a method of cooling a superconducting rotor coil 74, represented generally by reference numeral 84, is provided. The method comprises supplying a cryogenic fluid from a source of cryogenic fluid to a cryogenic transfer coupling disposed radially around a rotatable shaft, as represented by block 86. The method also comprises supplying the cryogenic fluid from the transfer coupling to a superconductive rotor coil through an inlet passageway extending radially through the rotatable shaft, as represented by block 88. Heat is transferred from the superconductive rotor coil to the cryogenic fluid, as represented by block 90. The method also comprises returning the cryogenic fluid to the transfer through an outlet passageway extending radially through the rotatable shaft, as represented by block 92. From there the cryogenic fluid is returned to the source of cryogenic fluid.

Figure 5:
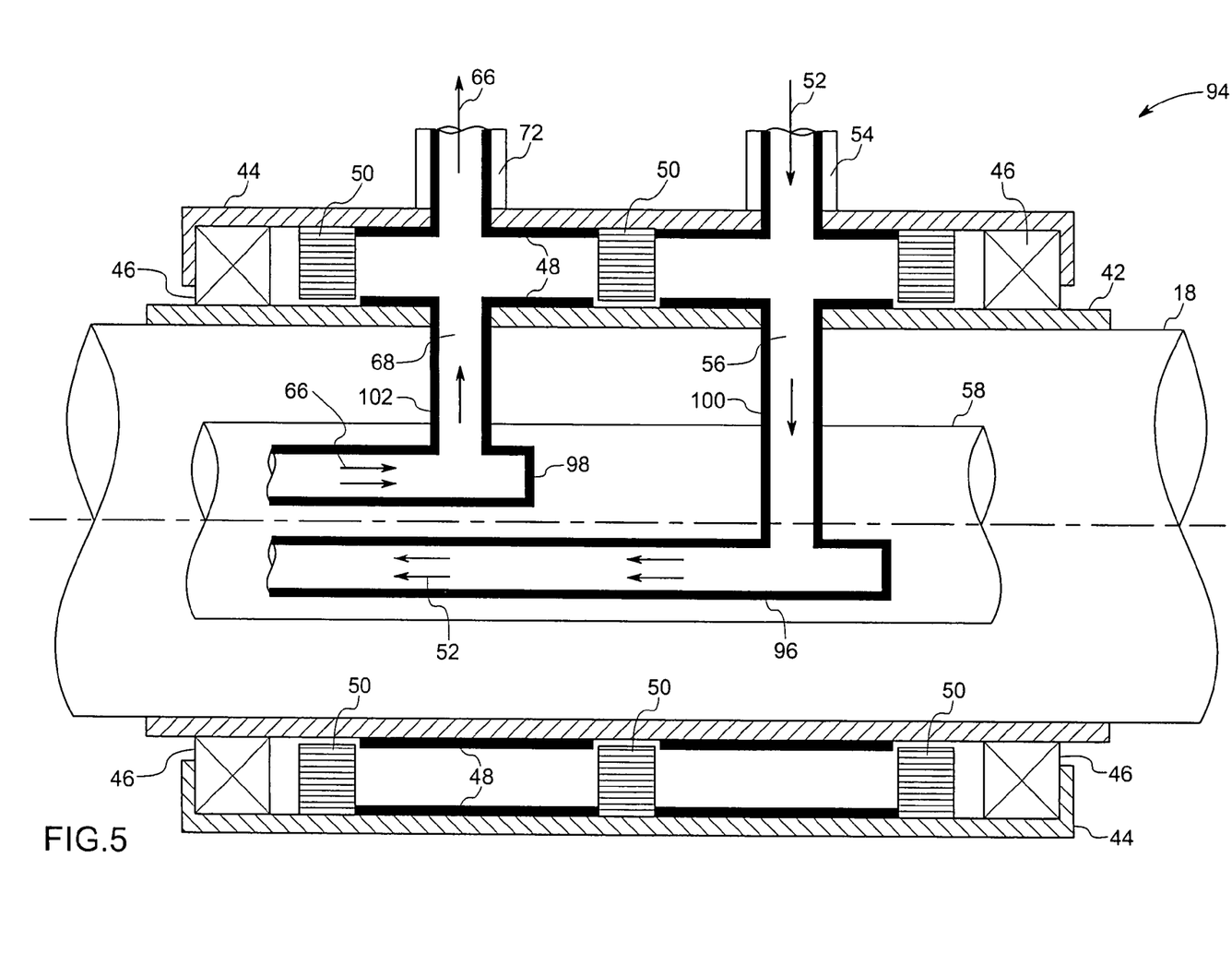
FIG. 5 is a cross-sectional view of an alternative embodiment of a cryogenic fluid transfer coupling, taken generally along line 2-2 of FIG. 1.

Referring generally to FIG. 5, an alternative embodiment of a cryogenic transfer system 94 is illustrated. In this embodiment, an alternative first axial tube 96 and an alternative second axial tube 98 are disposed within the rotatable shaft 18 in a side-by-side orientation, rather than a telescopic orientation. The rotatable shaft 18 is illustrated with a single central passageway 58. However, the rotatable shaft 18 may have separate passageways for the alternative first axial tube 96 and the alternative second axial tube 98. In addition, an alternative inlet tube 100 is used to couple the alternative first axial tube 96 to the transfer coupling 22 and an alternative outlet tube 102 is used to couple the alternative second axial tube 98 to the transfer coupling 22.

The techniques described above provide a system and method for supplying a superconductive rotor coil with cryogenic fluid from a location anywhere along the length of a rotor shaft. Thus, cryogenic fluid does not have to be transferred into the rotor shaft from an end position. This enables a generator to utilize a superconductive rotor coil even when there is no access to either end of the rotor shaft, such as the power generation system 10 illustrated in FIG. 1.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A rotating electrical machine, comprising:
   a superconductive rotor coil; and
   a rotatable shaft, comprising:
      an axial passageway extending through the rotatable shaft; and
      a first passageway extending through a side wall of the rotatable shaft to the axial passageway, wherein the axial passageway and the first passageway are operable to convey a cryogenic fluid to the superconductive rotor coil;
   wherein the first passageway is oriented transverse to the axial passageway at least through the side wall.

2. The rotating electrical machine as recited in claim 1, further comprising a second passageway extending through the side wall of the rotatable shaft to the axial passageway and operable to return the cryogenic fluid from the superconductive coil.

3. The rotating electrical machine as recited in claim 2, further comprising a first axial tube and a second axial tube disposed telescopically within the axial passageway.

4. The rotating electrical machine as recited in claim 2, further comprising a first axial tube and a second axial tube disposed side-by-side within the axial passageway.

5. The rotating electrical machine as recited in claim 3, wherein the first passageway is coupled to the first axial tube and the second passageway is coupled to the second axial tube.

6. The system as recited in claim 3, wherein the first axial tube and the second axial tube are doubled walled.

7. The rotating electrical machine as recited in claim 3, wherein the first axial tube and the second axial tube each comprise a coating operable to reduce the emissivity of the first axial tube and the second axial tube to reduce radiative heat transfer to the cryogenic fluid.

8. The rotating electrical machine as recited in claim 2, further comprising a cryogenic transfer coupling disposed radially around the rotatable shaft, wherein the cryogenic transfer coupling is operable to direct cryogenic fluid to the first passageway and to receive cryogenic fluid from the second passageway.

9. The rotating electrical machine as recited in claim 1, wherein the rotating electrical machine is a generator comprising a stator.

10. The rotating electrical machine as recited in claim 2, wherein the first passageway and the second passageway extend radially though the rotatable shaft.

11. A system for cryogenically cooling a superconductive rotor coil, comprising:
    a transfer coupling comprising a passageway operable to be disposed radially around a rotatable shaft to couple cryogenic fluid between a source of cryogenic fluid and another passageway extending through the rotatable shaft, wherein the cryogenic fluid is coupled from the rotatable shaft to the superconductive rotor coil;
    wherein the passageway and the other passageway are generally transverse to one another.

12. The system as recited claim 11, wherein the transfer coupling comprises a rotatable member secured to the rotatable shaft and a stationary member disposed in sealing arrangement with the rotatable member.

13. The system as recited claim 12, wherein the stationary member is aligned to direct cryogenic fluid into a first passageway in the rotatable shaft and to receive cryogenic fluid from a second passageway in the rotatable shaft.

14. The system as recited in claim 13, further comprising a first axial tube and a second axial tube disposed within the rotatable shaft, wherein the first passageway directs cryogenic fluid into the first axial tube and the second passageway receives cryogenic fluid from the second axial tube.

15. The system as recited in claim 14, wherein the first axial tube and the second axial tube are oriented in a telescopic orientation.

16. The system as recited in claim 14, wherein the first axial tube and the second axial tube are oriented in a side-by-side orientation.

17. The system as recited in claim 14, wherein the first axial tube and the second axial tube are double walled vacuum-sealed tubes.

18. The system as recited in claim 14, wherein the first axial tube comprises a coating operable to reduce radiative heat transfer from the first axial tube to the cryogenic fluid.

19. The system as recited in claim 13, comprising a first radial tube disposed in the first passageway to thermally insulate the cryogenic fluid flowing through the first passageway from the rotatable shaft.

20. A rotating electrical machine, comprising:
a rotor coil; and
a rotatable shaft, comprising:
a lengthwise passageway extending in a lengthwise direction through the rotatable shaft;
a crosswise passageway extending in a crosswise direction through an outer perimeter of the rotatable shaft to the lengthwise passageway, wherein the lengthwise and crosswise passageways are disposed in a coolant path extending to the rotor coil; and
another crosswise passageway extending in another crosswise direction through the rotatable shaft to the lengthwise passageway.

21. The rotating electrical machine as recited in claim 20, comprising a plurality of tubes disposed telescopically within the lengthwise passageway.

22. The rotating electrical machine as recited in claim 21, wherein at least one of the plurality of tubes is coupled to the crosswise passageway.

23. The rotating electrical machine as recited in claim 20, comprising a coolant transfer coupling disposed radially around the rotatable shaft, wherein the coolant transfer coupling is operable to exchange a coolant fluid with the crosswise passageway.

24. The system as recited in claim 11, further comprising a first passageway extending through a side wall of the rotatable shaft to the other passageway; wherein the first passageway and the other passageway are operable to convey a cryogenic fluid to the superconductive coil.

25. The system as recited in claim 24, further comprising a second passageway extending through the side all of the rotatable shaft to the other passageway; wherein the second passageway and the other passageway are operable to return the cryogenic fluid from the superconductive coil.

26. The rotating electrical machine as recited in claim 20, wherein the crosswise passageway and the lengthwise passageway are operable to convey a cryogenic fluid to the rotor coil.

27. The rotating electrical machine as recited in claim 26, wherein the other crosswise passageway and the lengthwise passageway are operable to return the cryogenic fluid to the rotor coil.

28. The rotating electrical machine as recited in claim 8, wherein the cryogenic transfer coupling further comprises a rotating collar coupled to the rotatable shaft and a stationary collar disposed around the rotating collar.

* * * * *

UNITED STATES PATENT AND TRADEMARK OFFICE
CERTIFICATE OF CORRECTION

| | |
|---|---|
| PATENT NO. | : 7,317,268 B2 |
| APPLICATION NO. | : 10/813366 |
| DATED | : January 8, 2008 |
| INVENTOR(S) | : James William Bray et al. |

It is certified that error appears in the above-identified patent and that said Letters Patent is hereby corrected as shown below:

Front page, item (75), the inventor's name reading "Xianrul Huang" should read --Xianrui Huang--.

Signed and Sealed this

Twenty-seventh Day of May, 2008

JON W. DUDAS
*Director of the United States Patent and Trademark Office*